Nov. 17, 1936.    O. STANKEY    2,060,907

VEHICLE SPEED TELLTALE

Filed Nov. 18, 1935

INVENTOR
OSCAR STANKEY
BY Ben V. Zillman
ATTORNEY

Patented Nov. 17, 1936

2,060,907

UNITED STATES PATENT OFFICE 2,060,907

VEHICLE SPEED TELLTALE

Oscar Stankey, East St. Louis, Ill.

Application November 18, 1935, Serial No. 50,376

4 Claims. (Cl. 116—116)

This invention relates to motor vehicles, and more particularly to a device intended for temporary attachment thereto by police officials or others of city or state departments having to do with the enforcement of motor vehicle traffic.

In those communities where the authorities endeavor to actually keep down the number of accidents arising from excessive speed of motor vehicles, there is a tendency to parole the violators and stay their fines upon their pledge to drive more carefully in the future. However, in order to provide a better check on these pledges, and to seek to train the offenders to drive with lower speeds, I have provided a device which is attached to the motor vehicle of the traffic violator whose fine has been stayed upon his pledge, and which will have an element that will fracture or become otherwise permanently marred upon the occasion of the driver exceeding the speed limit that he has pledged himself to keep. He must then pay the fine originally imposed upon him.

The invention has among its objects the provision of a device of this kind that may be easily and simply constructed, is economical, sturdy, which will not interfere in any way with the normal operation of the vehicle, and which is otherwise efficient and satisfactory for use whereever deemed applicable.

Another object of my invention is to provide a device of the kind described, in which there is arranged a frangible element normally spaced from a movable weight, the latter being centrifugally controlled so as to be actuated against said frangible element with sufficient force to fracture the latter, when the speed of the vehicle attains a predetermined point.

A further object of the invention is to provide a device of the kind described, wherein the elements may be sealed against tampering except by authorized persons.

Many other objects and advantages of the construction herein shown and described will be obvious to those skilled in the art to which this invention appertains, as will be apparent from the disclosures herein given.

To this end, my invention consists in the novel arrangement, construction, and combination of parts herein shown and described, as will be more clearly pointed out in the claims hereunto appended.

Figure 1:
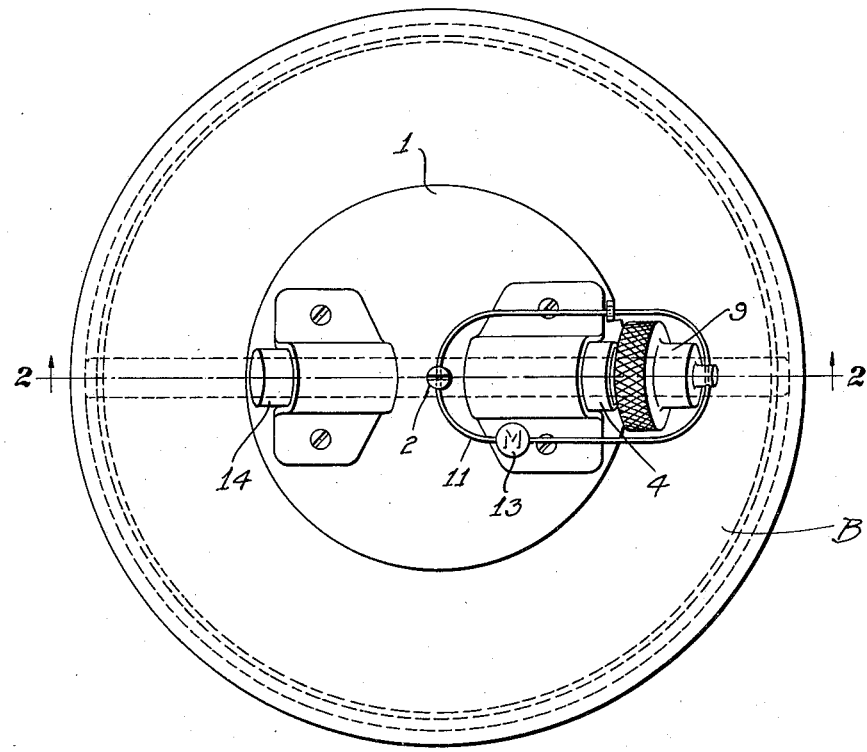
Figure 2:
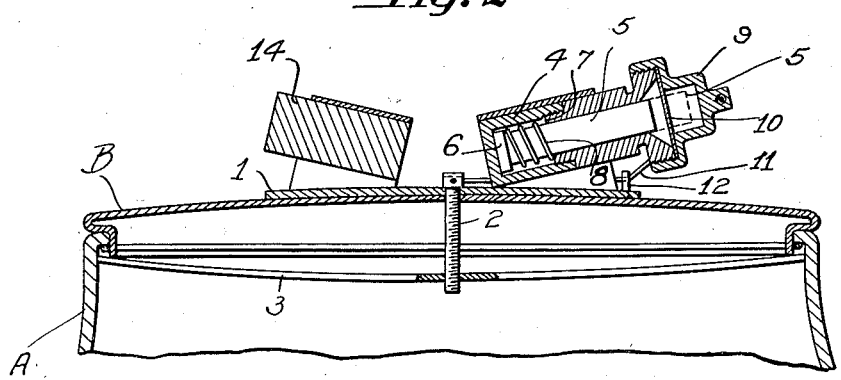

In the drawing, wherein like reference characters indicate like or corresponding parts throughout the drawing, Figure 1 is a side elevation of the hub cap and its associated elements, mounted on the wheel hub; and Figure 2 is a cross-sectional view through the same, taken substantially along the line 2—2 of Fig. 1.

Referring more particularly to the drawing, wherein I have illustrated a preferred embodiment of my invention, A indicates the hub of one of the wheels of a motor vehicle of any size, shape or construction, preferably the right rear wheel inasmuch as that one is easiest of inspection by one on the side walk.

These hubs are generally provided with caps for detachable mounting thereon, so as to form a good closure thereat against dirt and the weather, but permitting access to the bolts that secure the wheel to the axle when it is desired to inspect the latter, remove the wheel or for any other purpose. In order not to damage these regularly furnished hub caps, they may be removed during the period that my device is employed on the vehicle.

A temporary hub cap B, of a size and shape that will correctly fit the hub of the particular wheel to which it is to be applied, is furnished, said hub being provided with a disk, plate or base member 1 mounted thereon. Any desired manner of interlocking said disk to said hub to prevent accidental rotational movement relatively therebetween, may be provided, as by a screw 2 through the disk and into a cross bar 3 that extends radially of the latter and whose free ends preferably interlock with the cap. As the screw is tightened up, the opposite sides of the hub cap are clamped to the disk and cross bar respectively.

Extending radially of and mounted on the disk is a chamber member 4 having a weight or plunger 5 movable longitudinally therein and provided with an enlarged head 6 to abut the internal shoulder or flange 7 provided in the chamber at the outermost limit of travel. A spring 8 may be provided if desired, to retract the plunger to its innermost position, as by interposing it between the head 6 and flange 7.

It will be noted that the length of the bore of the chamber is such that the plunger will be retained at its lowermost position when there is no force sufficient to actuate it outwardly, but permits a limited amount of longitudinal travel of the plunger outwardly from said position shown.

An end or cover element 9 may be removably arranged at the outermost end of the chamber to normally provide a closure thereat. Obviously, as the speed of the wheel increases, the centrifugal force increases proportionately, and urges the weight 5 radially outwardly, against the pressure of the spring 8, and hence the distance that said plunger moves in said outward direction may be computed for any given speed of the vehicle.

In order to obtain a permanent indication that a given speed of the vehicle has been reached, in violation of the pledge of the driver not to drive at that speed, I have placed an indicator element such as the frangible element 10 in the path of movement of the plunger and operably engaged thereby at a predetermined speed of the vehicle. This element 10 may be of paper, if desired, or some other cheap material that is easily fractured, and the seal of the city or other jurisdiction may be imprinted thereon to avoid substitutions. A length of flexible wire 11 may be threaded through several parts of the device so as to enable tampering to be detected, as for example through the screw 2, cover 9, and an ear 12 especially struck up on the disk 1, the ends of the wire interlocked with a bit of lead 13 having an identifying insignia thereon.

Obviously, the device may be arranged to have the plunger fracture the paper at a given speed, as the centrifugal force actuating the plunger is directly proportional to the vehicle speed, and a subsequent inspection of the paper will reveal such prior speed violation.

In order to operate the device with more perfect balance, I prefer to mount the counterweight 14 on the disk, the center of weight of said counterweight being substantially the same distance to one side of the center of the disk that the chamber with its contents are from the center, to the other side.

Although the device might be used in various ways, and at any rotationally driven member of the motor vehicle, I believe that it would be desirable to use it as follows:

The police department of a city or other traffic enforcement area might be provided with a supply of these devices hereinbefore set forth, mounted on the hubs that will fit the motor vehicles, and when a driver has been fined for a speed violation, his fine will be remitted or rather stayed upon his pledge to drive below a given maximum speed for a certain number of days and his willingness to permit one of the telltale caps to be mounted on his vehicle.

The telltale device is then mounted on the right rear wheel of the vehicle, and the driver is asked to report for inspection at certain times, even daily if desired. If the frangible disk is not fractured when the subsequent inspections are made, the chamber is again sealed up and further inspections are made during the parole period. However, if at any inspection, the paper has been fractured, the entire fine originally imposed becomes due and the parole revoked.

If desired, the telltale caps may be highly colored so as to make the driver more conscious of his pledge each time he enters his vehicle, and to advise others that any violation of traffic laws on their part will entail a like display.

When the parole period is ended, the telltale cap will be removed by the police department, and the regular hub cap returned and placed in position on the vehicle.

What I claim as new and desire to secure by Letters Patent is:

1. In a motor vehicle, a traffic speed tell-tale device for temporary use thereon and comprising a hub cap, frangible means on said cap and movable means controlled by the speed of said vehicle to rupture said frangible means at a predetermined speed of said vehicle.

2. In a device for indicating a violation of a predetermined speed set for a motor vehicle, a hub cap, a centrifugally movable element thereon, and a telltale sheet normally spaced from said element and in the path of movement of the latter so as to be ruptured thereby by a predetermined centrifugal movement of said element.

3. In a motor vehicle, a hub cap adapted to be mounted on one of the vehicle wheels, a weight on said cap and movable laterally to the axis of said wheel, and a frangible sheet sealed in place on said cap adjacent said weight and fracturable thereby when the latter has been actuated a given distance thereagainst by centrifugal force.

4. In a motor vehicle, a hub cap adapted to be mounted on one of the vehicle wheels, a plunger chamber on said cap, a movable plunger in said chamber, a sheet of paper sealed in place in said chamber and spaced from said plunger, whereby said sheet will be impacted by said plunger and fracture at a predetermined movement of the latter, and a counterweight on said cap and spaced from said chamber.

OSCAR STANKEY.